United States Patent
Smilovici et al.

(10) Patent No.: US 7,241,082 B2
(45) Date of Patent: Jul. 10, 2007

(54) DOUBLE-SIDED CUTTING INSERT AND MILLING CUTTER

(75) Inventors: Carol Smilovici, Nahariya (IL); Assaf Ballas, Akko (IL)

(73) Assignee: Iscar Ltd., Tefen (IL)

( * ) Notice: Subject to any disclaimer, the term of this patent is extended or adjusted under 35 U.S.C. 154(b) by 257 days.

(21) Appl. No.: 11/023,597

(22) Filed: Dec. 29, 2004

(65) Prior Publication Data

US 2005/0169716 A1    Aug. 4, 2005

(30) Foreign Application Priority Data

Feb. 4, 2004   (IL) .................................. 160223

(51) Int. Cl.
*B23C 5/00*   (2006.01)
*B23C 1/00*   (2006.01)

(52) U.S. Cl. ................. 407/113; 407/114; 407/115; 407/116

(58) Field of Classification Search ............... 407/113, 407/114, 116, 115
See application file for complete search history.

(56) References Cited

U.S. PATENT DOCUMENTS

| 3,670,380 | A | | 6/1972 | Moore |
| 4,729,697 | A | * | 3/1988 | Lacey .......................... 407/42 |
| 5,333,972 | A | * | 8/1994 | Bernadic et al. ............ 407/113 |
| 5,556,239 | A | | 9/1996 | Reiterman et al. |
| 5,639,189 | A | * | 6/1997 | Hoefler ....................... 407/113 |
| 5,853,267 | A | | 12/1998 | Satran et al. |
| 6,203,251 | B1 | | 3/2001 | Oppelt et al. |

OTHER PUBLICATIONS

IPER dated Mar. 15, 2006 in co-pending International Application No. PCT/IL2005/000042 with amended claims examined therein.

* cited by examiner

*Primary Examiner*—Willmon Fridie, Jr.
(74) *Attorney, Agent, or Firm*—Womble Carlyle (57) ABSTRACT

A double-sided cutting insert, for use in a milling cutter, having two identical opposing end surfaces and two opposing identical major side surfaces with a through bore extending between, and opening out to, the major side surfaces. Major cutting edges are formed at the intersection of each major side surface with each end surface. Adjacent each major cutting edge, in each major side surface, is a primary relief surface. In each cross section of the cutting insert taken in a plane generally perpendicular to the major side surfaces, a line tangent to the primary relief surface at the major cutting edge is inclined to a median plane of the cutting insert at an acute interior angle.

16 Claims, 6 Drawing Sheets

DOUBLE-SIDED CUTTING INSERT AND MILLING CUTTER

FIELD OF THE INVENTION

The present invention relates to a double-sided indexable cutting insert and a milling cutter for use in metal cutting processes.

BACKGROUND OF THE INVENTION

There is disclosed in WO 97/17157 a face milling cutter employing a double-sided indexable cutting insert having a prismoidal shape with two opposed generally rectangular rake surfaces connected by side surfaces. The cutting insert has a basic "negative" geometry and therefore in order to provide the necessary clearance between the cutting insert and the workpiece, when mounted in a face-mill, the cutting insert is oriented with a negative axial rake angle. However, negative axial rake angles may be disadvantageous, e.g., they have been found to be deficient in cutting efficiency for applications involving difficult to machine materials.

A double-sided indexable cutting insert for a boring tool head is disclosed in U.S. Pat. No. 5,333,972. The insert is provided at each end with a protruding flat island. Each long cutting edge is inclined at an angle of 3° relative to the protruding flat island, defining an "insert axial rake angle". Rearward of each cutting edge is a descending land surface that merges with an increasing incident angle surface to form a chip breaker groove. Each increasing incident angle surface extends from its associated descending land surface to an adjacent island, at either the top or the bottom of the cutting insert. The cutting insert is left or right handed. It is manufactured to be right-handed and, when flipped around, is left-handed. It will be appreciated that the magnitude of the insert axial rake angle is limited for practical reasons. Any increase in the insert axial rake angle will result in an increase in the "vertical" extent of the increasing incident angle surface (see FIG. 3 of U.S. Pat. No. 5,333,972) that may have an adverse effect on chip development and evacuation.

There is disclosed in WO 96/35536 a double-sided indexable cutting insert which when mounted in a face-mill has a positive axial rake angle, even when the necessary clearance between the cutting insert and the workpiece is provided. This cutting insert presents two peripheral edges for a right-hand face mill and two peripheral edges for a left-hand face mill. In a side view (see FIG. 9) the cutting insert is generally rhomboidal in shape. The main cutting edges 10 of each end surface are parallel (see also FIGS. 7 and 8) to each other and to a centrally located protruding abutment member 12. The cutting insert is retained in an insert pocket with the abutment member of a non-operative end surface and an adjacent non-operative relief surface in abutment with respective support surfaces of the insert pocket. The abutment member of the non-operative end surface and the adjacent non-operative relief surface merge at an acute-angled mounting corner. In order to change the axial rake angle of the operative cutting edge, either the insert pocket has to be rotated, or a cutting insert having a mounting corner with a different mounting angle has to be used. In either case, a different milling cutter has to be used. Moreover, the axial rake and relief angles are interdependent and any change in the axial relief angle results in a corresponding change in the relief angle, which is not always desirable.

U.S. Pat. No. 5,853,267 describes a single-sided "reversed-relief" indexable cutting insert having side surfaces with, adjacent to the cutting edges, upper primary reliefs that are inclined to the insert base at an acute interior angle, that is, the reverse of positive inserts. Cutting inserts having side surfaces which are inclined to the insert base at an obtuse interior angle are known as "positive" inserts. Cutting inserts having side surfaces which are at right angles to the insert base are known as "negative" or "neutral" inserts. A principal advantage of negative inserts is that they can be designed to be double-sided and therefore provide twice as many indexable cutting edges in comparison with positive inserts. There are also known in the art double positive inserts, which also provide twice as many indexable cutting edges in comparison with positive inserts. However, the cutting edges of such inserts may be weaker than those of negative inserts since the cutting wedge angles of double positive inserts are smaller than those of negative inserts.

Cutting inserts of the type described in US '267, that is, single-sided reversed-relief inserts, are advantageous in that the cutting edges of these inserts are generally stronger than in negative or positive inserts. However, the cutting insert disclosed in US '267 is a one-sided beveled relief cutting insert. Moreover, the through bore for receiving a clamping screw opens out to the upper chip surface. This sets a limit on the minimum width (distance between the major cutting edges) of the cutting insert. In addition, the cutting insert disclosed in US '267 is "radially" oriented when seated in a milling cutter. In such cutting inserts, the distance between the cutting edges and the base of the cutting insert defines a minimal dimension of the cutting insert. During a cutting operation, the cutting forces are directed generally along the minor dimension. On the other hand, tangential cutting inserts, also known as on-edge, or lay down, cutting inserts, are oriented in an insert holder in such a manner that during a cutting operation on a workpiece the cutting forces are directed along a major (thicker) dimension of the cutting insert. An advantage of such an arrangement being that the cutting insert can withstand greater cutting forces than when oriented in such a manner that the cutting forces are directed along a minor (thinner) dimension of the cutting insert. The present invention relates to double-sided reversed-relief cutting inserts.

Although it is conceivable to obtain double-sided reversed-relief inserts by grinding primary relief adjacent the cutting edges at both ends of a negative insert, grinding is an additional manufacturing operation that increases time and production costs of the cutting inserts.

It is an object of the present invention, to provide a double-sided tangential reversed-relief cutting insert which is preferably pressed or molded into its final shape, having a through bore for receiving a clamping screw which does not pass through the chip surfaces. Since double-sided inserts do not have a base opposite the chip surface, the angle of the primary relief is measured with respect to a median plane of the cutting insert.

SUMMARY OF THE INVENTION

In accordance with the present invention there is provided a double-sided cutting insert, for use in a milling cutter, comprising:
  two identical opposing end surfaces and a peripheral side surface extending therebetween, the peripheral side surface comprising two opposing identical major side surfaces with a through bore extending between, and opening out to, the major side surfaces;

four spaced apart major cutting edges, each major cutting edge formed at the intersection of each major side surface with each end surface; and a primary relief surface adjacent each major cutting edge, wherein in each cross section of the cutting insert taken in a plane generally perpendicular to the major side surfaces, a line tangent to each primary relief surface extending from the major cutting edge adjacent each primary relief surface is inclined to a median plane of the cutting insert at an acute interior angle.

In accordance with one embodiment, in each cross section of the cutting insert taken in a plane generally perpendicular to the major side surfaces, the cross section of each primary relief surface is a straight line.

In accordance with another embodiment, in each cross section of the cutting insert taken in a plane generally perpendicular to the major side surfaces, the cross section of each primary relief surface is a convex curve.

In accordance with another embodiment, each end surface comprises a rake surface adjacent each major cutting edge, the rake surface extending from the major cutting edges in a generally inward direction of the cutting insert to an inner end surface.

In accordance with one embodiment, in each cross section of the cutting insert taken in a plane generally perpendicular to the major side surfaces the cross section of each rake surface is a straight line.

In accordance with another embodiment, in each cross section of the cutting insert taken in a plane generally perpendicular to the major side surfaces the cross section of each rake surface is a concave curve.

Generally, the peripheral side surface may further comprise two opposing identical minor side surfaces, with a minor cutting edge formed at the intersection of each minor side surface with each end surface.

Further generally, the major side surfaces may be of a generally parallelogrammatic shape.

If desired, the inner end surface of each end surface is flat and the inner end surfaces of each end surface are parallel to each other.

In accordance with the present invention, each end surface has four corners, two diagonally opposed lowered corners and two diagonally opposed raised corners, the lowered corners being closer to the median plane than the raised corners.

There is also provided in accordance with the present invention, a milling cutter comprising:

at least one cutting insert in accordance with the present invention; and a cutter body having at least one insert pocket in which the at least one cutting insert is retained, the at least one insert pocket comprising adjacent side and rear walls generally transverse to a base; the base being provided with a threaded bore for receiving a clamping screw for securing the cutting insert in the insert pocket, the side wall being provided with an axial location surface that abuts a given minor side surface of the at least one cutting insert; the rear wall being provided with two protruding tangential location surfaces, located on either side of a central recessed region of the rear wall, that abut a given inner end surface of the at least one cutting insert.

BRIEF DESCRIPTION OF THE DRAWINGS

For a better understanding, the invention will now be described, by way of example only, with reference to the accompanying drawings in which.

DETAILED DESCRIPTION OF THE INVENTION

Attention is first drawn to FIGS. 1 to 7, showing a cutting insert 10 in accordance with the present invention there. The cutting insert 10 is indexable, and is typically manufactured by form-pressing or by injection molding and sintering carbide powders. The cutting insert 10 comprises two identical opposing end surfaces 12 of a generally rectangular shape in an end view of the cutting insert 10. Each end surface 12 has 180° rotational symmetry about a first axis A1 passing through the two end surfaces 12.

Figure 1:
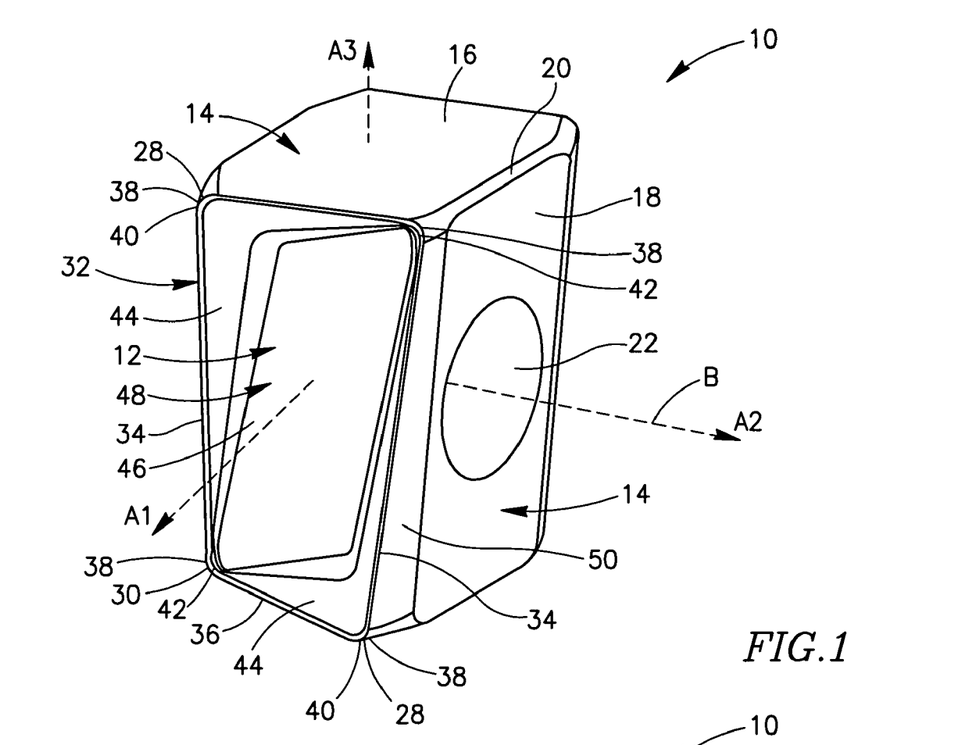
FIG. 1 is a perspective view of a cutting insert in accordance with the present invention.

A peripheral side surface 14 extends between the two opposing end surfaces 12 and comprises two opposed identical minor side surfaces 16, two opposed identical major side surfaces 18 of a generally parallelogrammatic shape, and corner side surfaces 20 located between adjacent minor and major side surfaces 16, 18. The two identical opposing major side surfaces 18 each have 180° rotational symmetry about a second axis A2 which is perpendicular to the first axis A1 and passes through the opposing major side surfaces 18. Similarly, the two identical opposing minor side surfaces 16 each have 180° rotational symmetry about a third axis A3 passing through the opposing minor side surfaces 16. The third axis A3 is perpendicular to the first axis A1 and to the second axis A2. A minor plane P1 of the cutting insert 10 is defined by the first axis A1 and the second axis A2, and a median plane M of the cutting insert 10 is defined by the second axis A2 and the third axis A3. The cutting insert 10 is provided with a through bore 22 extending between, and opening out to, the major side surfaces 18. The bore has a bore axis B that coincides with the second axis A2. The through bore 22 is for receiving a clamping screw 24 in order to secure the cutting insert 10 to a milling cutter 26, as will be described below with reference to FIGS. 8 and 9.

Each end surface 12 has four corners, two diagonally opposed raised corners 28 and two diagonally opposed lowered corners 30. The raised corners 28 of each end surface 12 lie in an end surface plane P. The median plane M is parallel to, and lies midway between, the end surface planes P. The lowered corners 30 are closer to the median plane M than the raised corners 28. Each corner side surface 20 extends between a given raised corner 28 of one of the two opposing end surfaces 12 and a given lowered corner 30 of the other of one of the two opposing end surfaces 12.

A peripheral edge 32 is formed at the intersection of each end surface 12 and the peripheral side surface 14. For each end surface 12, the peripheral edge 32 comprises two major cutting edges 34, formed by the intersection of the major side surfaces 18 with the end surface 12; two minor cutting edges 36, formed by the intersection of the minor side surfaces 16 with the end surface 12; and four corner edges 38, two raised corner edges 40 and two lowered corner edges 42, formed by the intersection of the corner side surfaces 20 with the end surface 12. The raised corner edges 40 are corner cutting edges. If desired, the lowered corner edges 42 may also be corner cutting edges. In the embodiment shown in the figures, each major cutting edge 34 extends between a given raised corner edge 40 and given lowered corner edge 42. Similarly, each minor cutting edge 36 extends between a given raised corner edge 40 and given lowered corner edge 42. If desired, the minor cutting edges 36 are straight.

Figure 2:
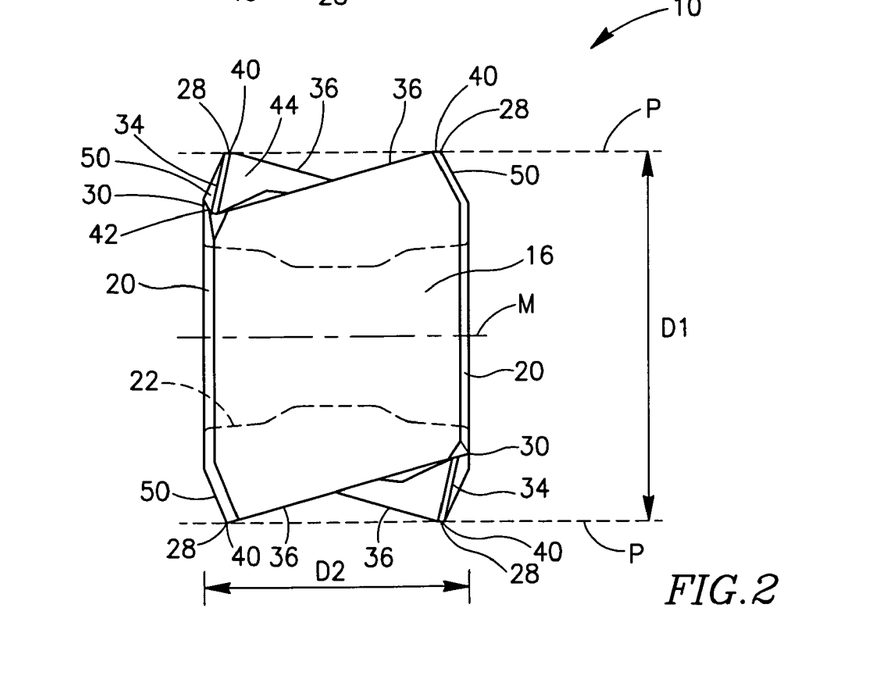
FIG. 2 is a first side view of the cutting insert in FIG. 1.
Figure 3:
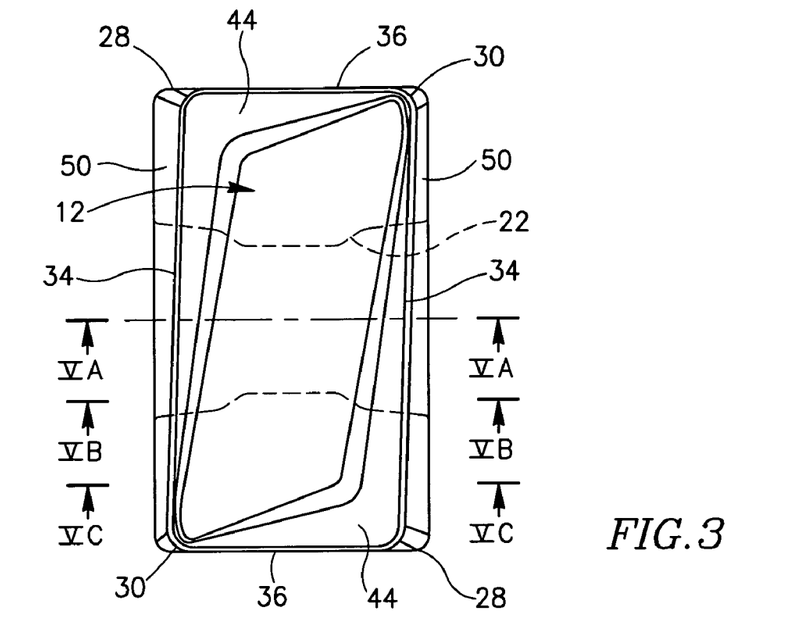
FIG. 3 is an end view of the cutting insert shown in FIG. 1.
Figure 4:
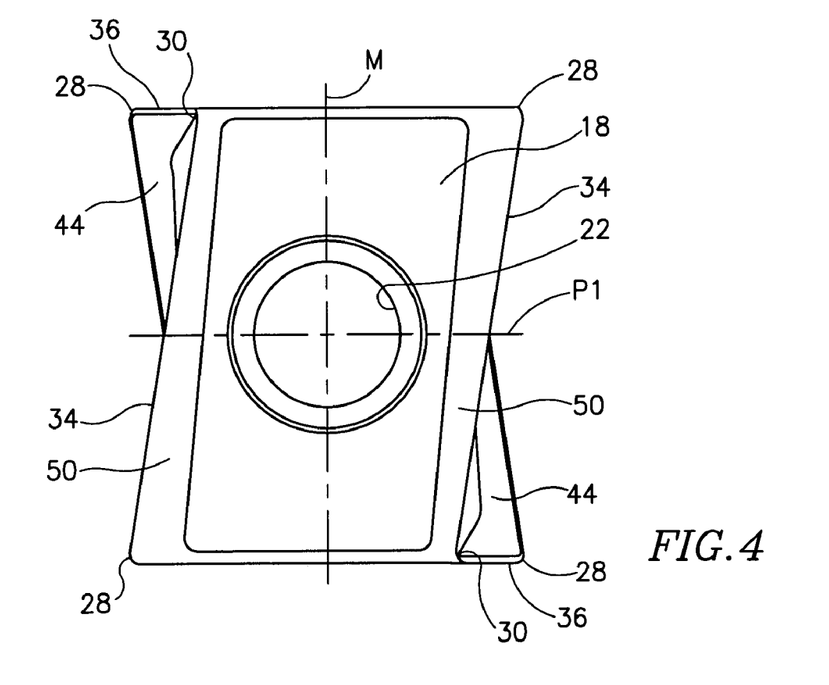
FIG. 4 is a second side view of the cutting insert shown in FIG. 1.

A major dimension D1 of the cutting insert 10 is defined between the end surface planes P, and a minor dimension D2 of the cutting insert 10 is defined between the major side surfaces 18 of the cutting insert 10 (see FIG. 2). The cutting insert 10 of the present invention is preferably a tangential cutting insert 10. That is, the major dimension D1 is preferably greater than the minor dimension D2.

Rake surfaces 44 are formed in each end face adjacent the major and minor cutting edges 34, 36 and the corner cutting edges 40 (42). The rake surfaces 44 extend from the major and minor cutting edges 34, 36 and from the corner cutting edges 40 (42) in an inward direction of the cutting insert 10 to an inner end surface 46. If desired, the inner end surface 46 of each end surface 12 is flat and the inner end surfaces 46 of each end surface 12 are parallel to each other. Preferably, in an end-view of the cutting insert 10, the inner end surfaces 46 have the form of a distorted parallelogram (see FIG. 3). During a metal cutting operation, chips cut from a workpiece flow from the part of the cutting edge that is in contact with the workpiece, along the rake surface 44 towards the inner end surface 46 and in general continue to flow along at least part of the inner end surface 46. Therefore, the rake surface 44 and the inner end surface 46 form a chip surface 48 of the cutting insert 10. The fact that the through bore 22 extends between the major side surfaces 18 and not between the insert end faces, as in many types of double-sided inserts is advantageous in that the chip surface is completely independent of the through bore 22. Therefore, the minor dimension D2 of the cutting insert 10 may be designed to be much smaller than it can in non-tangential cutting inserts in which the through bore 22 extends between and opens out to the chip surfaces, thereby limiting the extent to which the minor dimension D2 can be reduced. Therefore, advantageously, the cutting insert 10 of the present invention can be used in smaller diameter milling cutters than can non-tangential cutting inserts.

Figure 5A:
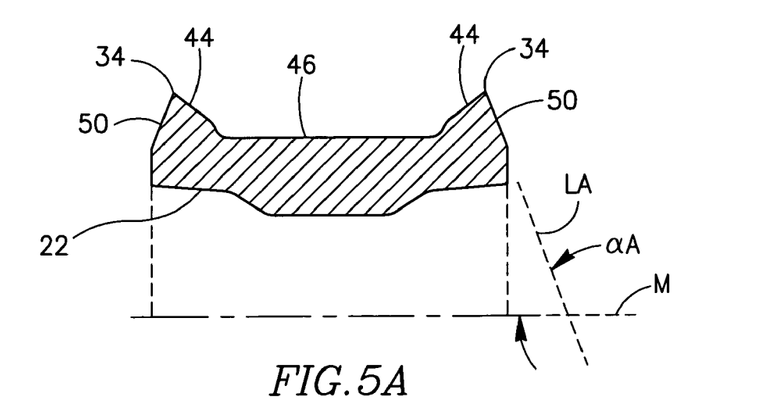
FIG. 5A is a partial cross section of the cutting insert shown in FIG. 1 taken along the line VA-VA in FIG. 3.
Figure 5B:
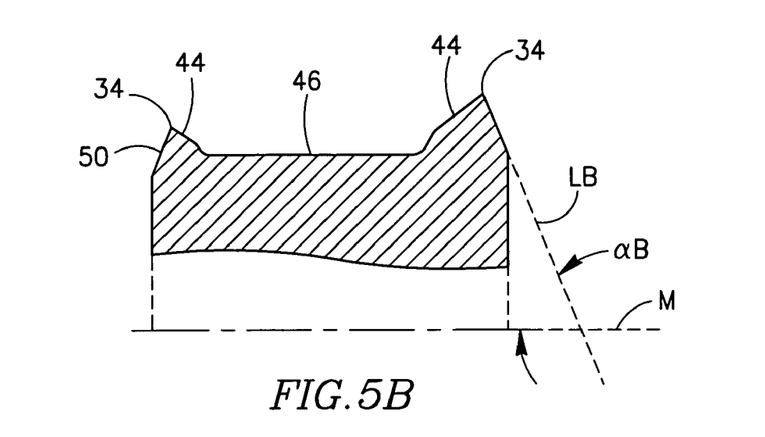
FIG. 5B is a partial cross section of the cutting insert shown in FIG. 1 taken along the line VB-VB in FIG. 3.
Figure 5C:
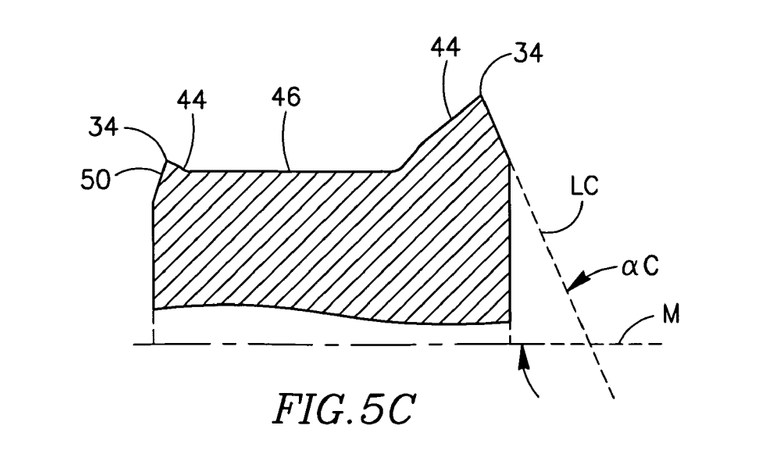
FIG. 5C is a partial cross section of the cutting insert shown in FIG. 1 taken along the line VC-VC in FIG. 3.
Figure 6:
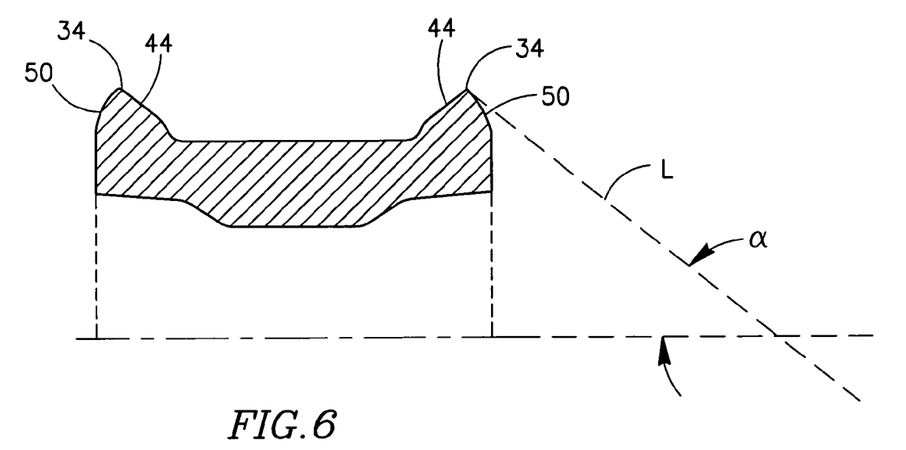
FIG. 6 is a cross section similar to FIGS. 5A to 5C but with curved primary relief surfaces.
Figure 7:
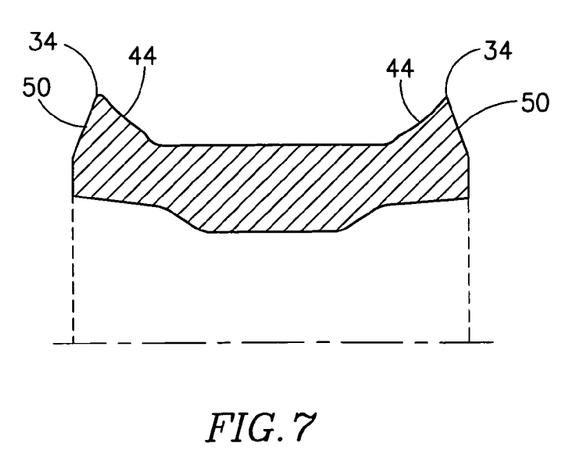
FIG. 7 is a cross section similar to FIGS. 5A to 5C but with curved rake surfaces.

Each major side surface 18 comprises a primary relief surface 50 adjacent each major cutting edge 34 extending from the major cutting edge 34 towards the median plane M. In each cross section of the cutting insert 10 taken in a plane generally perpendicular to the major side surfaces 18 (or, equivalently, in a plane parallel to the minor plane P1 of the cutting insert 10) a line L (LA, LB, LC) tangent to the primary relief surface 50 at the major cutting edge 34 is inclined to the median plane M of the cutting insert 10 at an acute interior angle α (αA, αB, αC). The interior angle α may be constant or may vary continuously along the major cutting edge 34. The variation of the interior angle α can be in accordance to any desired definition, for example it can vary along the major cutting edge 34 in such a way so as to define a helically twisting primary relief surface 50. The cross sections of the primary relief surfaces 50 may be straight, as shown in FIGS. 5A to 5C, or they may be convexly curved as shown in FIG. 6. The cross sections of the rake surfaces 44 may be straight as shown in FIGS. 5A to 5C, or they may be concavely curved as shown in FIG. 7.

In FIGS. 5A to 5C the cross section of the cutting insert 10 taken in a plane generally perpendicular to the major side surfaces 18 intersects each primary relief surface 50 in a straight line. Consequently, the lines L (LA, LB, LC) tangent to the primary relief surfaces 50 at the major cutting edges 34 coincide with the straight lines formed by the intersection of the plane generally perpendicular to the major side surfaces 18 and the primary relief surfaces 50. If the primary relief surfaces 50 are convexly curved as shown in FIG. 6, then the interior angle α is measure between a line tangent to the primary relief surface 50 at the major cutting edge 34.

Figure 8:
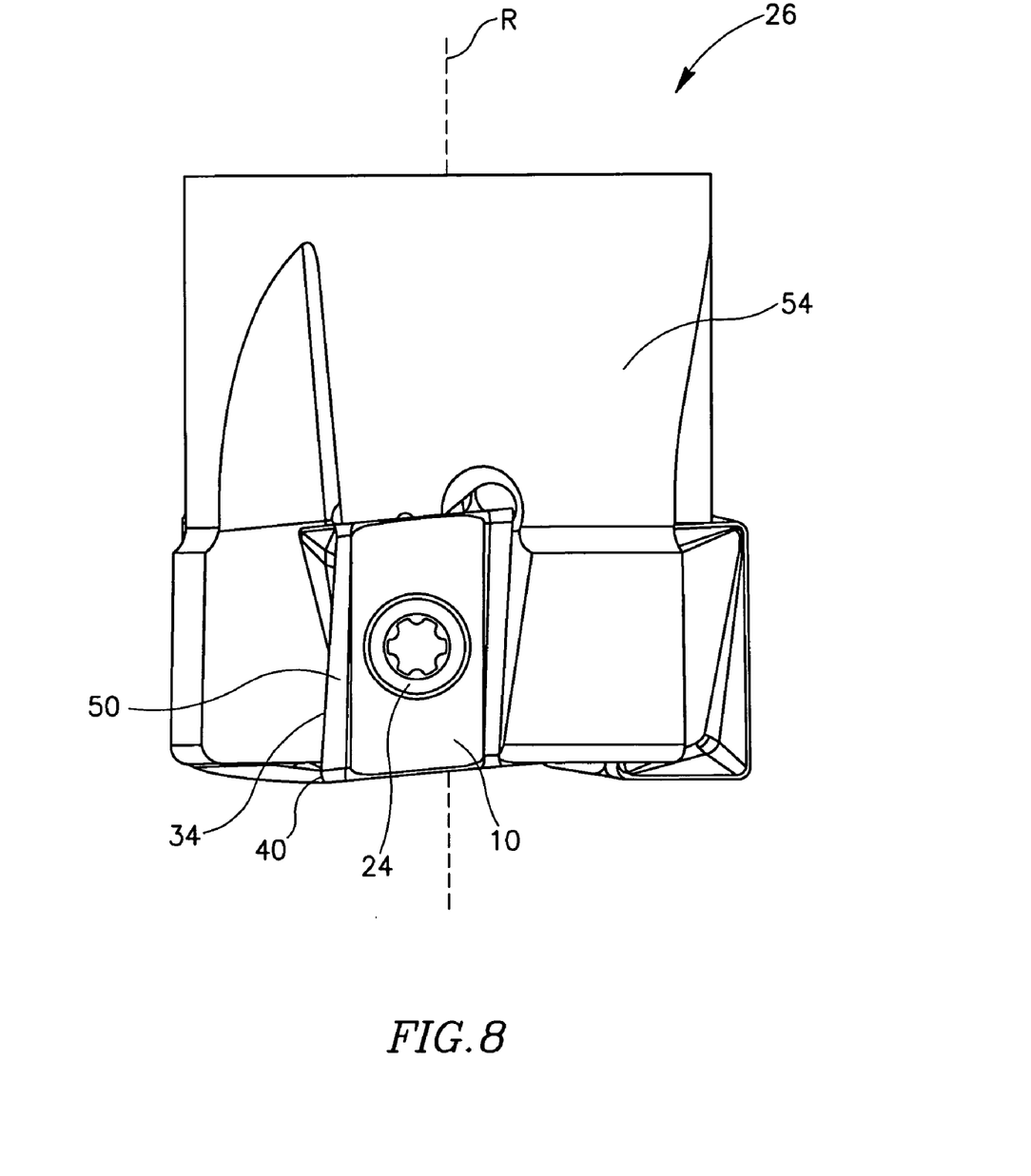
FIG. 8 is a side view of a milling cutter in accordance with the present invention.
Figure 9:
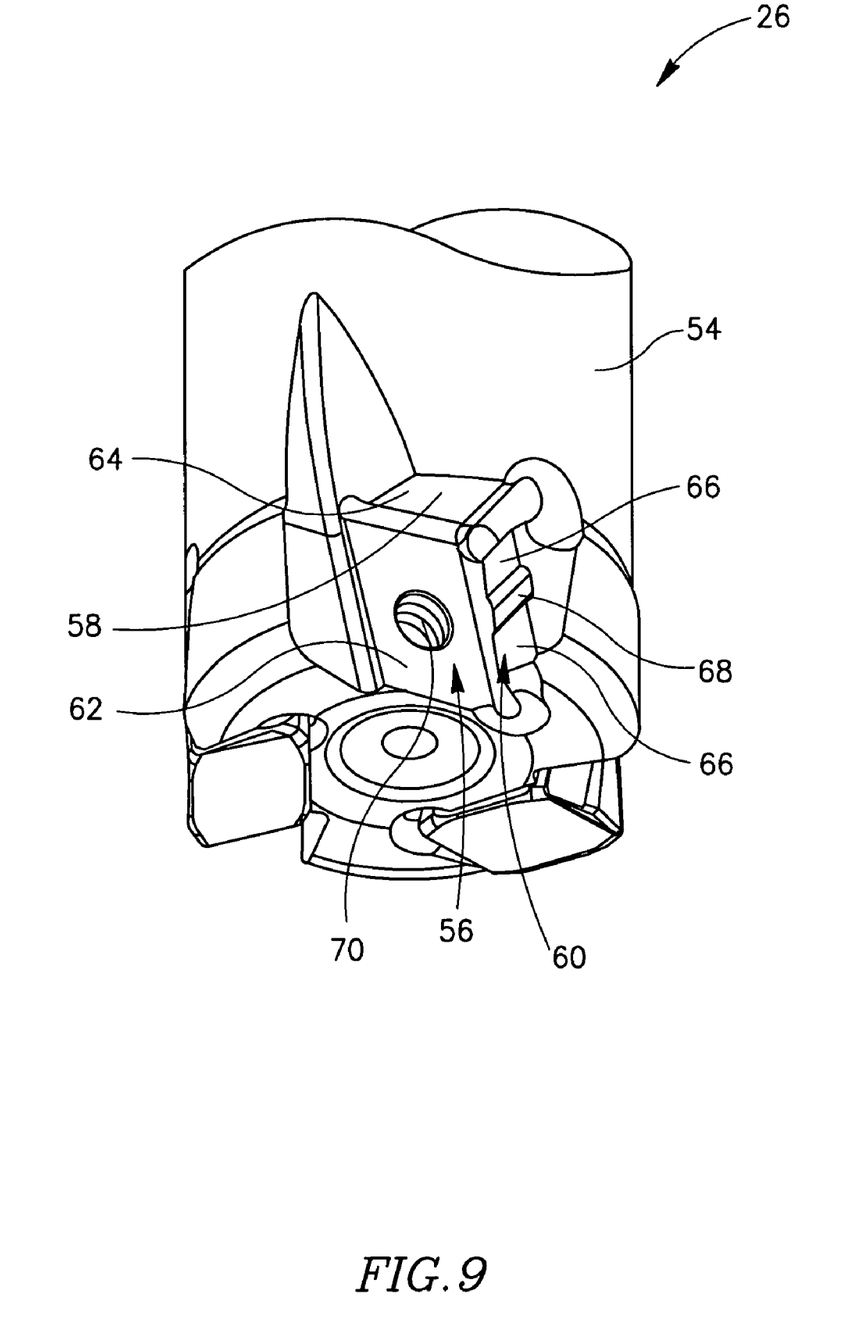
FIG. 9 is a perspective view of a portion of the cutter body of the milling cutter in accordance with the present invention, with a cutting insert removed from an insert pocket.

Attention is now drawn to FIG. 8, showing a milling cutter 26 with an axis of rotation R, having a cutter body 54 provided with a plurality of insert pockets 56. In each insert pocket 56 a cutting insert 10 in accordance with the present invention is clamped by means of a clamping screw 24. The insert pocket 56 comprises adjacent side and rear walls 58, 60 generally transverse to a base 62. The side wall 58 is provided with an axial location surface 64 and the rear wall 60 is provided with two protruding tangential location surfaces 66 located on either side of a central recessed region 68 of the rear wall 60. The base 62 of the insert pocket 56 is provided with a threaded bore 70 for receiving the clamping screw 24 in order to secure the cutting insert 10 in the insert pocket 56. When the cutting insert 10 is secured in the insert pocket 56, a given major side surface 18 will abut the base 62 of the insert pocket 56, the two tangential location surfaces 66 abut a given inner end surface 46 and the axial location surface 64 abuts a given minor side surface 16 of the cutting insert 10.

The cutting insert 10, in accordance with the present invention is preferably made of carbide powders and pressed or injection-molded into its final shape and then sintered. The major side surfaces 18 of the cutting insert 10 may be ground to increase the accuracy of the positioning of the cutting insert 10 in the insert pocket 56. Likewise, the minor side surfaces 16 may be ground, in order to increase the accuracy of the positioning of the cutting insert 10 in the insert pocket 56. However, the primary relief surfaces 50 are not necessarily ground.

Although the present invention has been described to a certain degree of particularity, it should be understood that various alterations and modifications could be made without departing from the spirit or scope of the invention as hereinafter claimed.

What is claimed is:

1. A double-sided cutting insert, for use in a milling cutter, comprising:
   two identical opposing end surfaces and a peripheral side surface extending therebetween, the peripheral side surface comprising two opposing identical major side surfaces;
   four spaced apart major cutting edges, each major cutting edge formed at the intersection of each major side surface with each end surface; and
   a primary relief surface adjacent each major cutting edge, wherein:
   in each cross section of the cutting insert taken in a plane generally perpendicular to the major side surfaces, a line tangent to each primary relief surface extending from the major cutting edge adjacent each primary relief surface is inclined to a median plane of the cutting insert at an acute interior angle; and each end surface has four corners, two diagonally opposed lowered corners and two diagonally opposed raised corners, the lowered corners being closer to the median plane than the raised corners.

2. The cutting insert according to claim 1, wherein in each cross section of the cutting insert taken in a plane generally perpendicular to the major side surfaces the cross section of each primary relief surface is a straight line.

3. The cutting insert according to claim 1, wherein in each cross section of the cutting insert taken in a plane generally perpendicular to the major side surfaces the cross section of each primary relief surface is a convex curve.

4. The cutting insert according to claim 1, wherein the peripheral side surface further comprises two opposing identical minor side surfaces, with a minor cutting edge formed at the intersection of each minor side surface with each end surface.

5. The cutting insert according to claim 1, wherein the major side surfaces are of a generally parallelogrammatic shape.

6. The cutting insert according to claim 1, wherein each end surface comprises a rake surface adjacent each major cutting edge, the rake surface extending from the major cutting edges in a generally inward direction of the cutting insert to an inner end surface.

7. The cutting insert according to claim 6, wherein in each cross section of the cutting insert taken in a plane generally perpendicular to the major side surfaces the cross section of each rake surface is a straight line.

8. The cutting insert according to claim 6, wherein in each cross section of the cutting insert taken in a plane generally perpendicular to the major side surfaces the cross section of each rake surface is a concave curve.

9. The cutting insert according to claim 6, wherein the inner end surface of each end surface is flat and the inner end surfaces of each end surface are parallel to each other.

10. The cutting insert according to claim 9, wherein each end surface comprises two raised corner edges and two lowered corner edges, formed by the intersection of corner side surfaces with each end surface, the raised corner edges being corner cutting edges.

11. The cutting insert according to claim 10, wherein the lowered corner edges are corner cutting edges.

12. The cutting insert according to claim 10, wherein each major cutting edge extends between a given raised corner edge and given lowered corner edge.

13. The cutting insert according to claim 10, wherein each minor cutting edge extends between a given raised corner edge and given lowered corner edge.

14. The cutting insert according to claim 13, wherein the minor cutting edges are straight.

15. The cutting insert according to claim 1, wherein a through bore extends between, and opens out to, the major side surfaces.

16. A milling cutter comprising:

at least one cutting insert; and a cutter body having at least one insert pocket in which the at least one cutting insert is retained, the at least one insert pocket comprising adjacent side and rear walls generally transverse to a base; the base being provided with a threaded bore for receiving a clamping screw for securing the cutting insert in the insert pocket, the side wall being provided with an axial location surface that abuts a given minor side surface of the at least one cutting insert; the rear wall being provided with two protruding tangential location surfaces, located on either side of a central recessed region of the rear wall, that abut a given inner end surface of the at least one cutting insert, wherein the at least one cutting insert comprises:

two identical opposing end surfaces and a peripheral side surface extending therebetween, the peripheral side surface comprising two opposing identical major side surfaces;

four spaced apart major cutting edges, each major cutting edge formed at the intersection of each major side surface with each end surface; and a primary relief surface adjacent each major cutting edge, wherein:

in each cross section of the cutting insert taken in a plane generally perpendicular to the major side surfaces, a line tangent to each primary relief surface extending from the major cutting edge adjacent each primary relief surface is inclined to a median plane of the cutting insert at an acute interior angle; and each end surface has four corners, two diagonally opposed lowered corners and two diagonally opposed raised corners, the lowered corners being closer to the median plane than the raised corners.

* * * * *